United States Patent [19]

Schulz et al.

[11] 4,255,965

[45] Mar. 17, 1981

[54] APPARATUS FOR DETECTING OSCILLATIONS OCCURRING DURING ENGINE KNOCK

[75] Inventors: Alfred Schulz, Oberriexingen; Bernward Böning; Uwe Kiencke, both of Ludwigsburg; Heinz Theuerkauf, Brunswick; Theodor Gast, Berlin; Günter Hönig, Ditzingen; Rudolf Nagel, Asperg, all of Fed. Rep. of Germany

[73] Assignee: Robert Bosch GmbH, Stuttgart, Fed. Rep. of Germany

[21] Appl. No.: 54,906

[22] Filed: Jul. 5, 1979

[30] Foreign Application Priority Data

Jul. 4, 1978 [DE] Fed. Rep. of Germany ....... 2829266

[51] Int. Cl.$^3$ ............................................ G01L 23/22
[52] U.S. Cl. ...................................... 73/35; 310/327
[58] Field of Search .................... 73/35, 116; 310/326, 310/327; 364/431, 551; 123/119 ED

[56] References Cited

U.S. PATENT DOCUMENTS 3,532,911  10/1970  Roberts et al. .................. 310/326 X

FOREIGN PATENT DOCUMENTS 2801969  7/1979  German Democratic Rep. ......... 73/35

Primary Examiner—Jerry W. Myracle
Attorney, Agent, or Firm—Frishauf, Holtz, Goodman & Woodward

[57] ABSTRACT

In order to suppress the train of detector oscillations after the disappearance of the engine knock phenomenon, the invention provides a piezoelectric oscillator which is set into vibration by engine knock and includes circuitry for applying signals of opposite polarity to the oscillator at times when no engine knock is expected. Accordingly, the output of the piezoelectric engine knock detector is used only in a relatively narrow time interval during the combustion cycle. In the remaining interval, the circuit switches over to a configuration where the oscillations of the piezoelectric oscillator are damped. The construction of the invention makes it possible to discriminate between different cylinders of a multi-cylinder engine and to assign the knock phenomenon to particular engine cylinders. A number of embodiments is presented.

16 Claims, 8 Drawing Figures

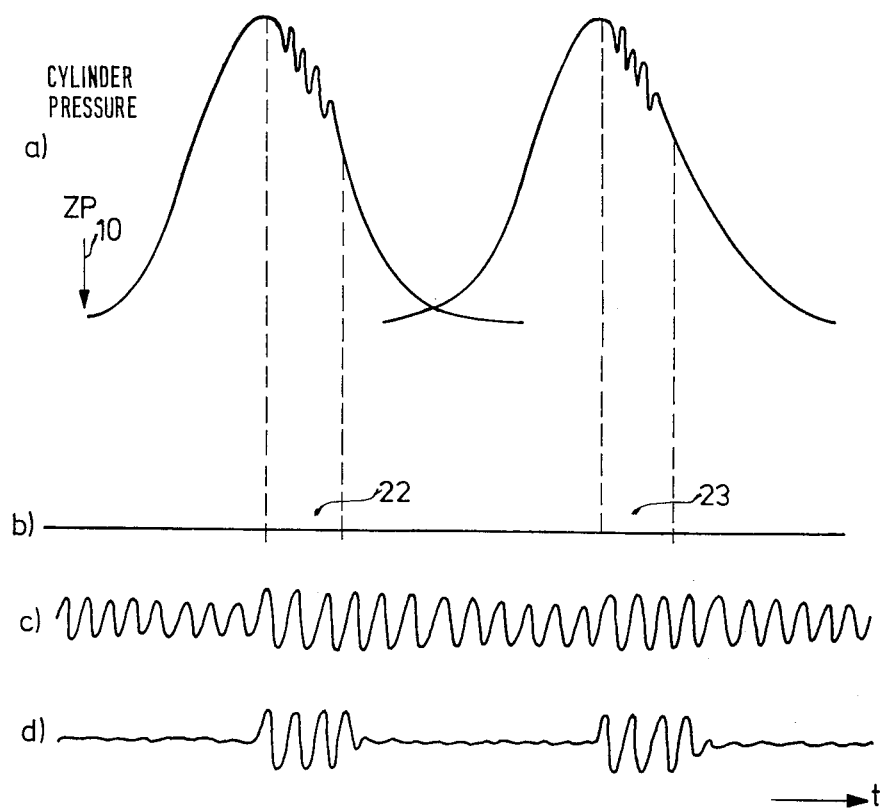
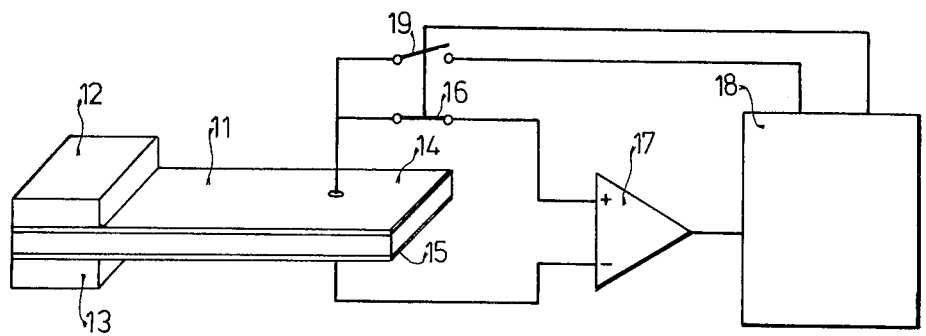

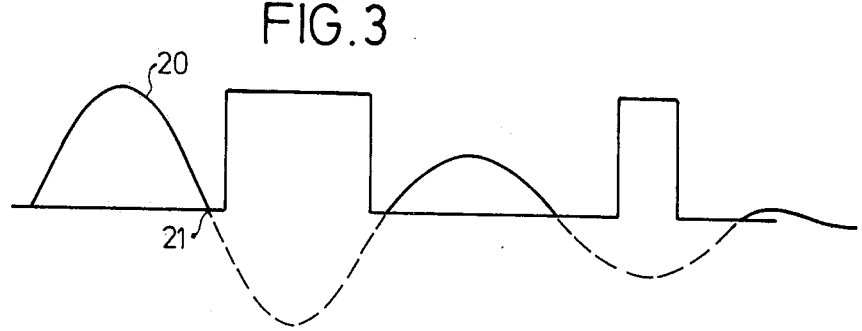
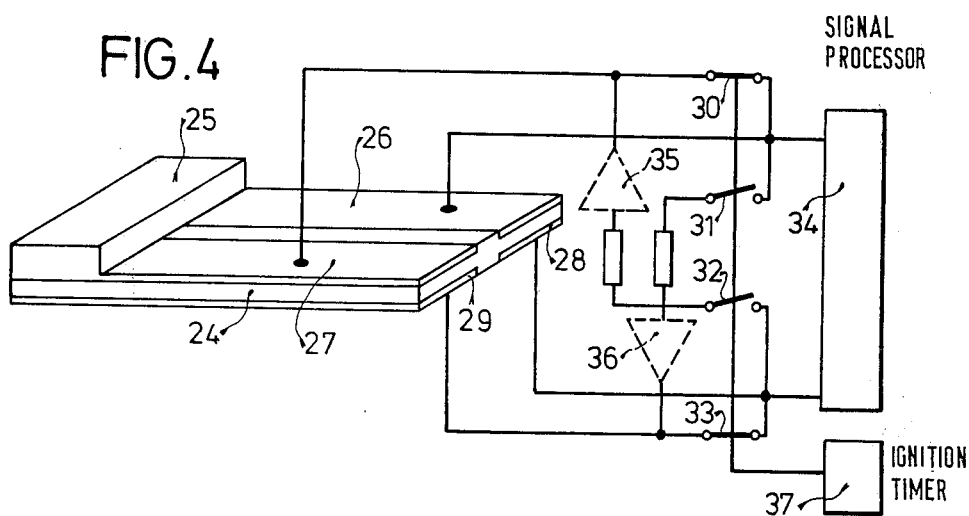
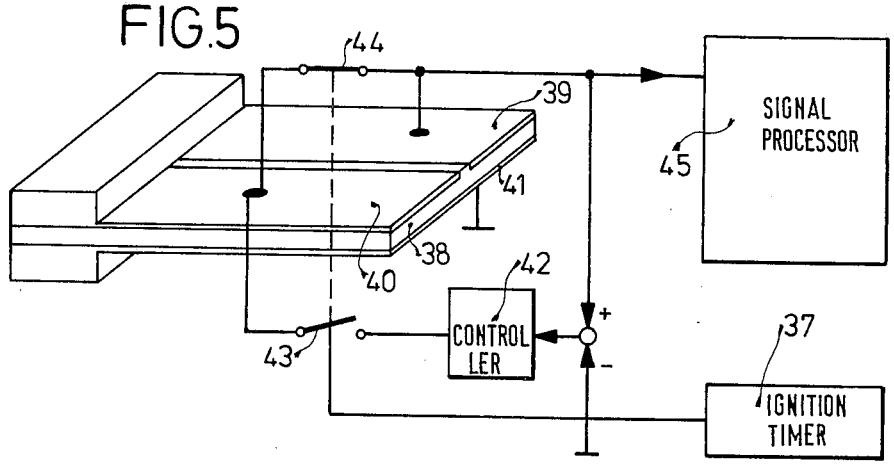

APPARATUS FOR DETECTING OSCILLATIONS OCCURRING DURING ENGINE KNOCK

FIELD OF THE INVENTION

The invention relates to internal combustion engines. More particularly, the invention relates to the detection of detonation, i.e., the occurrence of spontaneous and untimely combustion, commonly called "engine ping" or "knock". Specifically, the invention relates to an apparatus for the improved utilization of piezoelectric oscillation sensors.

BACKGROUND AND PRIOR ART

Known in the art is an apparatus for detecting engine knock by means of a cantilevered reed oscillator made of a piezoelectric material which may be tuned to the knock frequency of the engine. A detector of this type is highly sensitive for detecting detonation or knocking in combustion chambers of the engine. However, the high sensitivity of such oscillators brings the disadvantage that the induced oscillation continues beyond the occurrence of the knock phenomenon which drives them. Accordingly, when the detectors are used in multi-cylinder engines, it is often impossible to assign the occurrence of knocking to a particular cylinder. Furthermore, the high sensitivity of the known oscillator causes it to be forced into oscillation by spurious events, for example the closure of the inlet valves, etc.

OBJECT AND SUMMARY OF THE INVENTION

It is thus a principal object of the present invention to provide an engine knock detector which is capable of supplying a signal which may be definitely associated with an individual cylinder, i.e., with the possible detonation occurring therein. An associated object of the invention is to provide a knock detector which is relatively insensitive to spurious vibrations not directly related to engine knock. These and other objects are attained according to the invention by providing that the knock detector is responsive only in a predetermined time interval in which the knock is to be expected while it is rendered relatively insensitive by damping during the other times. Accordingly, errors are substantially prevented and the occurrence of engine knock can be assigned to individual cylinders of the multi-cylinder engine.

The invention, which is described in a number of embodiments, has the advantage of being very simple in construction and thus inexpensive to produce. The inherent simplicity of the apparatus of the invention also makes it very suitable for use in motor vehicles where it is subject to substantial stresses.

Details of the invention will emerge from the description of a number of preferred exemplary embodiments which relates to the drawing.

BRIEF DESCRIPTION OF THE DRAWING

FIG. 1 is a set of curves illustrating the variation of pressure in engine cylinders and the associated sensor signals;

FIG. 2 is a block circuit diagram of a first embodiment of the invention;

FIG. 3 is a diagram illustrating the function of the embodiment of FIG. 2;

FIG. 4 is a block diagram of a second embodiment of the invention;

FIG. 5 is an illustration of the third embodiment of the invention;

DESCRIPTION OF THE PREFERRED EMBODIMENTS

Figure 6:
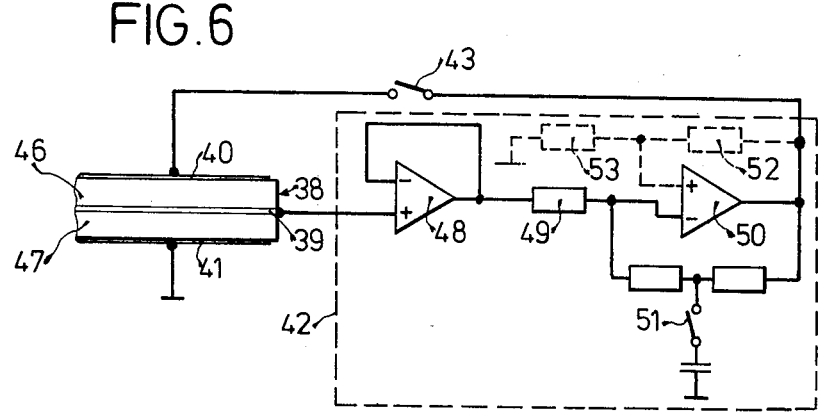
FIG. 6 is a detailed diagram including a circuit diagram of the controller according to FIG. 5.

The pressure in a typical combustion chamber of a multi-cylinder engine is illustrated for two different cylinders as a function of time in FIG. 1a. The point of ignition of the compressed fuel-air mixture is indicated for the first cylinder by the arrow 10. Subsequent to ignition, the pressure in the cylinder of the engine rises to a maximum after which detonation occurs as indicated by the wavy region of the curve. These regions are typical as representing the part of the combustion process in which engine knock usually occurs. The high sensitivity of piezoelectric detectors used for the detection of engine knock causes these detectors to continue to oscillate even after the forcing vibration has ceased, as indicated in FIG. 1c. The degree of damping in these high quality oscillators is so small as to prevent any substantial decay of the oscillation after the termination of the driving vibration. This continued oscillation is undesirable because it prevents the exact assignment of an engine knock to a particular cylinder of the engine. Furthermore, the superposition of a subsequent forcing vibration on the continued inherent oscillation may extinguish the oscillation signal even though engine knock is present. Still further, the oscillator is susceptible to being driven by spurious vibrations, for example the closure of the inlet valves of the engine. A desirable form of sensor signal, i.e., a signal which continues substantially only during the period of engine knock, i.e., within the time windows 22 and 23, is illustrated schematically in FIG. 1d. Such a signal may actually be obtained by the various embodiments of the apparatus of the invention as will now be discussed in detail.

In a first embodiment of the invention, shown in FIG. 2, a cantilevered oscillator 11 is clamped by means of a suitable clamping device 12, 13 which may be attached, for example, to the cylinder head of the engine. The occurrence of engine knock causes the oscillator 11 to begin vibrating. For the purposes of this specification, the term "engine knock" will be defined as audio frequency oscillations of the compressed fuel-air mixture which are themselves initiated by a shock wave. During such oscillations of the mixture, the heat transfer to the piston and the cylinder walls of the engine is greatly increased and may lead to thermal overloading and damage of these surfaces. For these and other reasons, engine knock is generally undesirable and should be prevented. However, it may be desirable to operate the engine in a relatively wide operating range, i.e., close to the occurrence of engine knock, so that detection devices for informing the operator of engine knock are very useful.

The oscillator 11 illustrated in FIG. 2 includes two electrodes 14 and 15, the electrode 14 being a measuring electrode connected via a first switch 16 to the inverting input of an operational amplifier 17. The second electrode 15 is grounded and is also connected to the non-inverting input of the operational amplifier. The output of the amplifier 17 is connected to a zero crossing detector which can actuate the switch 16 as well as a second switch 19 which couples the measuring electrode to the zero crossing detector.

During the measuring phase of the circuit, the first switch 16 is closed while the second switch 19 is open. The zero crossing detector 18 reacts to the occurrence of the passage through zero of the curve 20 (see FIG. 3) at the point 21 and causes the opening of the switch 16 and the closure of the switch 19 in the second half cycle of the signal shown in dashed lines in FIG. 3. During that time, a signal of opposite polarity, indicated by the square wave portion of the curve of FIG. 3, is applied to the piezoelectric oscillator, resulting in its being damped in the time intervals between the windows 22 and 23.

The signal of opposite phase which is generated by the device 18 can be of fixed amplitude and/or pulse width. Such a signal may be generated, for example, by a monostable multivibrator, not shown. However, it is even more advantageous if the amplitude of the signal from the oscillator 11 is detected, for example, by peak rectification. Such information may then be used to adapt the pulse width and/or amplitude of the counter phase voltage pulse applied to the oscillator for damping. The energy content of such a pulse may be made to correspond to that of the output pulse of the sensor, thereby causing a particularly rapid damping and decay of the sensor signal.

The control of the switches, i.e., the switchover from an output operation to an input operation, i.e., from generator-type action to a motor-type action, results in a particularly effective and simple damping of the oscillator.

A second embodiment of the invention for damping an oscillator between the two time windows 22 and 23 is shown in FIG. 4. In this embodiment, a cantilevered oscillator 24 is clamped by a clamping device 25. The upper electrode is composed of two partial electrodes 26 and 27 and the lower electrode is divided into partial electrodes 28 and 29. A first switch 30 can connect the partial electrode 26 to the partial electrode 27 while a switch 31 can connect the partial electrode 26 to the partial electrode 29. Similarly, a third switch 32 can connect the partial electrodes 28 and 27 and a fourth switch 33 can connect the partial electrodes 28 and 29. A signal processor 34 serves to receive and process the sensor signal.

During the measuring phase, the circuit is in the condition illustrated in FIG. 4. In this condition, the first switch 30 and the fourth switch 33 are both closed, thereby connecting the partial electrodes 26 and 27 and also connecting the partial electrodes 28 and 29. In this phase, the oscillator operates in the generator mode and delivers an output signal to the processor circuit 34.

In the damping phase, the switches 30, 31, 32 and 33 are switched over to their respective opposite states, i.e., switches 30 and 33 open and switches 31 and 32 close. This configuration connects the partial electrodes 26 and 29 and also connects the partial electrodes 26 and 28. The equalization of charge which takes place over these connections causes the oscillator to be damped and come to rest. In some cases, it may be suitable to amplify the output signal of the oscillator prior to its application to the opposite electrode by means of operational amplifiers 35 and 36 shown in FIG. 4 in dashed lines. The presence of such amplifiers permits the exact compensation of the electrical energy and a rapid damping of the oscillator.

The switchover of the switches 30-33 at the beginning of the damping phase and the measuring phase may take place, for example, with the aid of an ignition timing system 37. For example, if the engine employs a digitally controlled ignition timer 37 with a tachogenerator, the switchover of the switches 30-33 may take place at some particular pulse count of a counter with reference to some predetermined angular position of the crankshaft, for example TDC. Thus the switches 30 and 33 may be closed shortly before the onset of the time window 22 while the switches 31 and 32 are opened. At the end of the window 22, the switches 30 and 33 are opened while the switches 31 and 32 are closed.

Another exemplary embodiment of the invention is shown in FIG. 5. A cantilevered oscillator 38 has a double electrode 39 and 40 opposed by a single electrode 41 connected to a reference potential, for example ground. The partial electrode 39 is connected to a controller 42 whose output is connected through a first switch 43 to the second partial electrode 40. The two partial electrodes 39 and 40 may also be connected to one another by a second switch 44. During the measuring phase, the switch 44 is closed while the first switch 43 is open and these conditions are reversed during the damping phase. During the measuring phase, the electrodes 39 and 40 are both in the generator mode so that their output signal is received and processed by the signal processor 45. During the damping phase, the signal from the electrode 39 serves as the actual value for the controller 42 which also receives a reference value of magnitude zero. Thus the controller delivers a signal through the partial electrode 40 which causes the arrest of the oscillator 38. This arrangement results in a particularly rapid and effective damping. As in the embodiment of FIG. 4, the control of the switches 43 and 44 may be effected by means of the ignition timer 37.

The controller 42 of FIG. 5 is illustrated in detail in FIG. 6. The oscillator 38 is seen to be a piezoelectric bending oscillator with two oppositely polarized halves 46 and 47. The metal-lined channels of the oscillator which are used only for polarization and serve no subsequent function are employed here as partial electrodes 39 for taking out the electrical signal. The voltage occurring between the partial electrode 39 (and/or parallel channels) on the one hand and the reference electrode 41 on the other hand, is fed to an impedance converter 48 which is part of the controller 42. The output of the impedance converter 48 is connected through a resistor 49 to the input of a proportional-differential controller 50 (PD controller) whose output signal is fed to the partial electrode 40 via the first switch 43. In this closed control loop, the leading signal from the controller output is applied to the oscillator which is part of the control loop and which is deformed in proportion to this signal and therefore also generates a proportional output signal back to the electrode 39 which is returned to the controller. The use of a PD controller 50 and a control loop of second order with oscillating characteristics imparts to the control loop a transient response function having a damping component which depends on the control parameters. The D-component of the PD controller stabilizes the control loop. If this D-component is switched out of the circuit by means of the switch 51, the control loop is capable of oscillation at a natural frequency which depends on the amplification factor of the controller. This property makes it possible to tune the inherent frequency of the oscillator 38.

If a background noise is present in the system, the damping of the controller 42 may be further improved by neutralizing the direct capacitive coupling between the electrode 40 and the electrode 39. This may be done by providing a positive feedback path of suitable magnitude in the controller 50, for example with the aid of resistors 52 and 53, shown in dashed lines, and connected between the output of the controller 50 and its non-inverting input.

Figure 7:
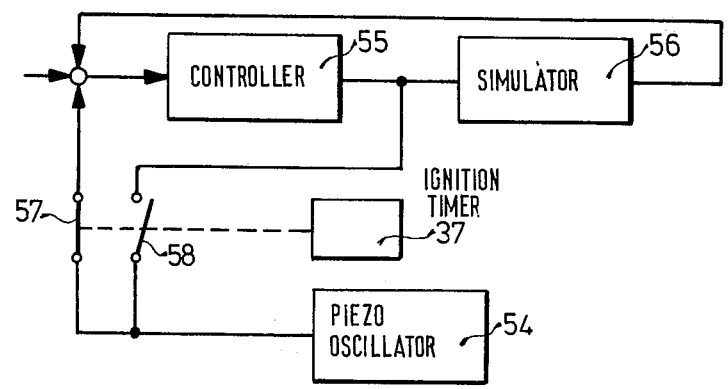
FIG. 7 is an illustration of a fourth embodiment of the invention.

A further exemplary embodiment of the invention is illustrated in FIG. 7. A cantilevered oscillator 54 is connected through a first switch 57 to a controller 55. Following the controller 55 is a signal generator 56 which simulates the output signal of the oscillator. This device may consist, for example, of two feedback integrators with variable frequency and damping. The output of the simulator 56 is applied to the input of the controller 55. Through a second switch 58, the oscillator 54 is connected to the output of the controller 55 as well as to the input of the simulator 56. In the measuring phase of this circuit, the first switch 57 is closed and the second switch 58 is open. During this phase, the output signal of the oscillator 54 serves as the reference value for the control loop which includes the controller 55 and the simulator 56. Accordingly, the simulator 56 is adjusted to the frequency and amplitude of the oscillator output signal. Just prior to the end of the measuring period, the first switch is opened, thereby applying a reference value zero to the control loop 55, 56, while at the same time the output of the controller 55 is now applied to the oscillator via the previously open switch 58. The reference value zero causes the controller to generate an output signal for the simulator 56 which causes the oscillator to be damped, i.e., to come to rest. During the damping phase therefore, the simulator 56 as well as the oscillator 54 receive an input signal which results in a damping of the oscillation.

The switchover of the switches 57 and 58 may take place, as in the exemplary embodiments of FIGS. 4 and 5, on the basis of signals from the ignition timer 37 which generates pulses that are related to the crankshaft position.

Figure 8:
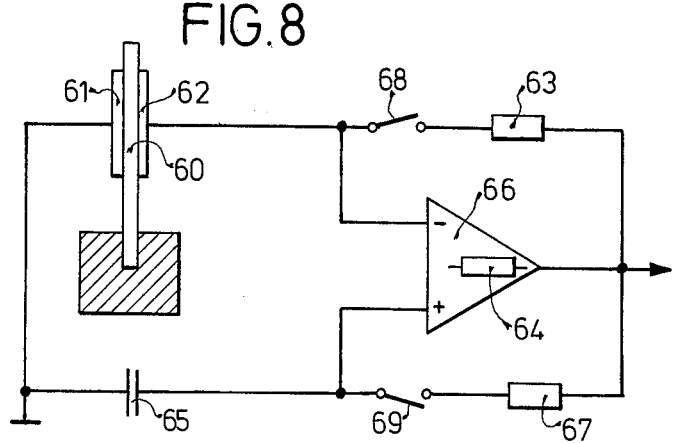
FIG. 8 is a block diagram of a fifth embodiment of the invention.

Yet another exemplary embodiment of the invention is illustrated in FIG. 8, showing a bending oscillator 60 with two electrodes 61 and 62. The principle underlying the embodiment of FIG. 8 is that the damping of the oscillator is particularly effective if the damping signal leads the deformation of the oscillator by 90 degrees. Such a leading damping signal may be obtained across a low value ohmic resistor 63 in a circuit which also includes the oscillator 60 with electrodes 61 and 62 serving as a capacitance $C_s$ and an output resistor 64 which is part of an operational amplifier 66. During mechanical excitations of the oscillator, a current flows which is substantially proportional to the velocity of oscillation and this current generates across the resistor 63 a voltage which obeys $$U_{R63} = j\omega \cdot C_s U_{pi} R_{63}.$$

In this relation, the voltage $U_{pi}$ is the piezoelectric potential of the oscillator. The voltage $U_{R63}$ is suitably amplified and coupled into the circuit. It appears across the resistor 65 as an inherent voltage. However, this feedback voltage causes a current in the resistor 63 not only indirectly by piezoelectric excitation but also directly through the purely dielectric capacitance $C_{sel}$ of the oscillator. This results in an additional component of feedback voltage which may be large with respect to the desired component. The undesired component may be compensated for by positive feedback through a branch which includes the electrode 61, a capacitor 65 and a resistor 67 in which the ratio of capacitances is so chosen as to obey the following relation $$(C_{sel}/C_{65}) = (R_{67}/R_{63}).$$

The two capacitively generated voltages cancel one another within the operational amplifier 66 so that only the piezoelectrically generated and amplified voltage which leads the deformation by 90 degrees is fed back to the oscillator 60.

The apparatus of FIG. 8 is made ready for measurement by the opening of the switches 68, 69 while their closure causes the damping of the oscillator 60.

The foregoing description relates to preferred exemplary embodiments of the invention. Features of one embodiment may be used in any other and other variants and embodiments are possible, all within the spirit and scope of the invention.

We claim:

1. An engine knock detector comprising:
   a piezoelectric oscillator cantilevered to a part of said engine;
   a signal processor selectively connectable to said oscillator for receiving and processing electrical signals from said oscillator during a measuring phase;
   a damping circuit selectively connectable to said oscillator for damping the oscillations of said oscillator during a damping phase; and
   further comprising a zero crossing detector circuit (18) connected to said oscillator (11) for detecting the zero crossing of the output signal from said oscillator (11) and for thereafter applying a voltage of opposite polarity to the electrodes (14, 15) of said oscillator (11).

2. An apparatus according to claim 1, further comprising an operational amplifier (17) one input of which is connected via a first switch (16) to one electrode (14) of said oscillator (11), the output of said operational amplifier (17) being connected to said zero crossing detector (18), and said zero crossing detector (18) being connected through a switch (19) to one electrode (14) of said oscillator (11).

3. An apparatus according to claim 1, wherein the voltage applied to said oscillator (11) by said zero crossing detector (18) has a fixed amplitude and pulse width.

4. An apparatus according to claim 1, wherein said zero crossing detector (18) includes means for determining the amplitude of the output signal of said oscillator, and wherein the voltage applied to said oscillator (11) by said zero crossing detector (18) is adapted to the detected amplitude of the output signal from said oscillator (11).

5. An engine knock detector comprising:
   a piezoelectric oscillator cantilevered to a part of said engine;
   a signal processor selectively connectable to said oscillator for receiving and processing electrical signals from said oscillator during a measuring phase;
   a damping circuit selectively connectable to said oscillator for damping the oscillations of said oscillator during a damping phase; and
   wherein (FIG. 4) the electrodes of said oscillator (24) are divided into pairs of partial electrodes (26, 27 and 28, 29) and wherein said apparatus includes a switch (30) for selective connection of said partial electrodes (26, 27) and a switch (33) for selective connection of said partial electrodes (28, 29) and wherein the apparatus further includes a switch (31) for selective connection of said electrodes (26, 29) and a switch (32) for selective connection of said electrodes (27, 28).

6. An apparatus according to claim 5, further comprising an amplifier (35) for amplifying the signal from the partial electrode (28) and applying it to the diagonally opposite partial electrode (27) and the apparatus further includes an amplifier (36) for amplifying the signal from the partial electrode (26) and applying it to the diagonally opposite partial electrode (29).

7. An engine knock detector comprising:
a piezoelectric oscillator cantilevered to a part of said engine;
a signal processor selectively connectable to said oscillator for receiving and processing electrical signals from said oscillator during a measuring phase;
a damping circuit selectively connectable to said oscillator for damping the oscillations of said oscillator during a damping phase; and
wherein (FIG. 5) said piezoelectric oscillator (38) has at least three electrodes of which at least two electrodes (39, 41) serve to deliver the electrical output signal of said oscillator (38) and one of said electrodes (41) being connected to a third electrode (40) for the application of an electrical signal generated by an electronic circuit (42) for the arbitrary change of the inherent frequency and for the damping of the oscillator (38).

8. An apparatus according to claim 7, wherein (FIG. 6) said electronic circuit (42) includes an impedance converter (48) connected to the electrode (39) of said piezoelectric oscillator (38), said impedance converter (48) being connected to a proportional/differential controller (50) whose output is connected to an electrode (40) of said oscillator (38).

9. An apparatus according to claim 7, further comprising means for applying an auxiliary signal of opposite phase to said oscillator (38) to compensate for the capacitive coupling between the measuring electrode and the feedback electrode thereof.

10. An apparatus according to claim 7, wherein said piezoelectric oscillator has one split electrode, having a first portion serving as a measuring electrode (39) and a second portion serving as a feedback electrode (40).

11. An apparatus according to claim 7, wherein said piezoelectric oscillator has longitudinal polarizing channels which serve as a measuring electrode.

12. An apparatus according to claim 7, wherein said electronic circuit (42) includes means for altering the amplification factor thereof; whereby the inherent frequency of said oscillator (38) may be varied.

13. An engine knock detector comprising:
a piezoelectric oscillator cantilevered to a part of said engine;
a signal processor selectively connectable to said oscillator for receiving and processing electrical signals from said oscillator during a measuring phase;
a damping circuit selectively connectable to said oscillator for damping the oscillations of said oscillator during a damping phase; and
wherein (FIG. 7) there is provided an electronic signal simulator (56) for simulating the output signal from said oscillator (54), connected to a controller (55) via a first switch (57), the output of said controller (55) being connectable via a second switch (58) to said oscillator (54); whereby during said measuring phase said first switch (57) is closed and said second switch (58) is open and the output signal of said oscillator (54) serves as the set-point value for the control loop consisting of said controller (55) and said simulator (56) and wherein during said damping phase, said first switch (57) is open and said second switch (58) is closed and the set-point value for said control loop (55, 56) is zero.

14. An engine knock detector comprising:
a piezoelectric oscillator cantilevered to a part of said engine;
a signal processor selectively connectable to said oscillator for receiving and processing electrical signals from said oscillator during a measuring phase;
a damping circuit selectively connectable to said oscillator for damping the oscillations of said oscillator during a damping phase; and
further comprising switches (30, 31, 32, 33, 43, 44, 57, 58) for providing selective connection of said signal processor and said damping circuit to and from said oscillator, said switches being connected to and controlled by the ignition timing system (37) of said engine.

15. An engine knock detector comprising:
a piezoelectric oscillator cantilevered to a part of said engine;
a signal processor selectively connectable to said oscillator for receiving and processing electrical signals from said oscillator during a measuring phase;
a damping circuit selectively connectable to said oscillator for damping the oscillations of said oscillator during a damping phase; and
wherein (FIG. 8) said piezoelectric oscillator has two electrodes (61, 62), said electrode (62) being connected to generate a voltage drop across a resistor (63) to serve as a measuring signal, and said apparatus including an RC branch (65, 67) for compensating a capacitive component of said measuring signal.

16. An apparatus according to claim 15, comprising an operational amplifier (66), the inverting input of which is connected to said electrode (62) and the non-inverting input is connected to said electrode (61) across a capacitor (65) and wherein the inverting input of said operational amplifier (66) is further connected via a switch (68) and said resistance (63) to the output thereof and the non-inverting input of said operational amplifier (66) is connected through a switch (69) and a resistor (67) to the output thereof.

* * * * *